(12) United States Patent
Young (10) Patent No.: US 12,492,946 B2
(45) Date of Patent: Dec. 9, 2025

(54) MOUNTABLE SENSOR HOUSING SYSTEM (71) Applicant: Ultra Automation LLC, Overland Park, KS (US)

(72) Inventor: Bret E. Young, Gardner, KS (US)

(73) Assignee: Ultra Automation LLC, Overland Park, KS (US)

( * ) Notice: Subject to any disclaimer, the term of this patent is extended or adjusted under 35 U.S.C. 154(b) by 404 days.

(21) Appl. No.: 18/308,666

(22) Filed: Apr. 27, 2023

(65) Prior Publication Data
US 2023/0349770 A1    Nov. 2, 2023

Related U.S. Application Data

(60) Provisional application No. 63/363,772, filed on Apr. 28, 2022.

(51) Int. Cl.
  *G01K 1/08*    (2021.01)
  *G01K 7/00*    (2006.01)
(52) U.S. Cl.
  CPC .............. *G01K 1/08* (2013.01); *G01K 7/00* (2013.01)

(58) Field of Classification Search
  CPC .................................. G01K 1/08; G01K 7/00
  See application file for complete search history.

(56) References Cited

FOREIGN PATENT DOCUMENTS

| WO | WO-2020263310 A1 | * | 12/2020 | ............... G01K 1/16 |
| WO | WO-2022093208 A1 | * | 5/2022 | ............... G01K 1/08 |

\* cited by examiner

*Primary Examiner* — Laura Martin
*Assistant Examiner* — Julia Fitzpatrick
(74) *Attorney, Agent, or Firm* — AVEK IP, LLC (57) ABSTRACT

A housing may include a first U-shaped portion having a first wall, a second wall, and a third wall, and an attachment feature, the second wall having a slot with a recess and apertures therein, the first wall and the third wall each having a reception area. The housing may include a second U-shaped portion, the second U-shaped portion having a fourth wall, a fifth wall, a sixth wall, a mating feature, and a hole therein. The housing may include a clip having protrusions for mounting to a railing, the clip being situated within the slot such that the protrusions extend through the apertures. The housing may include a circuit board, the circuit board being received within the reception areas such that the sensor extends through the hole. The U-shaped portions are coupled via the attachment feature and the mating feature.

20 Claims, 10 Drawing Sheets

MOUNTABLE SENSOR HOUSING SYSTEM

CROSS REFERENCE TO RELATED APPLICATIONS

This application claims priority to U.S. Provisional Patent Application No. 63/363,772, filed Apr. 28, 2022, the disclosure of which is incorporated herein in its entirety by reference.

FIELD OF THE DISCLOSURE

This disclosure relates to sensor systems, and more specifically, to housings for sensor systems that are mountable to a Deutches Institut fur Normung (DIN) rail.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a housing for housing a sensor, the housing including: a first U-shaped portion, the first U-shaped portion having a first wall, a second wall, and a third wall, the first wall opposing the third wall, each of the first wall and the third wall extending perpendicularly from the second wall, the second wall having at least one slot, the at least one slot having a recess with a first aperture and a second aperture each extending through the second wall, the first wall and the third wall each having a respective reception area, and at least one of the first wall, the second wall, and the third wall having an attachment feature; a second U-shaped portion, the second U-shaped portion having a fourth wall, a fifth wall, and a sixth wall, the fourth wall and the sixth wall extending perpendicularly from the fifth wall, at least one of the fourth wall and the sixth wall having a hole extending therethrough, and a mating feature being provided on at least one of the fourth wall, the fifth wall, and the sixth wall; a clip having a first protrusion and a second protrusion, the clip being situated within the slot such that a portion of the clip is within said recess, the first protrusion extends through the first aperture, and the second protrusion extends through the second aperture; and a circuit board associated with the sensor, the circuit board being received within the respective reception areas such that the sensor extends through the hole; wherein: the first U-shaped portion and the second U-shaped portion are coupled to each other such that the attachment feature mates with the mating feature; and the first protrusion and the second protrusion are configured to mount said housing to a railing.

In some aspects, the techniques described herein relate to a housing, wherein the railing is a DIN railing.

In some aspects, the techniques described herein relate to a housing, further including a computing system configured to receive sensor detections from the sensor.

In some aspects, the techniques described herein relate to a housing, wherein the attachment feature and the mating feature are configured to temporarily secure the first U-shaped portion and the second U-shaped portion together.

In some aspects, the techniques described herein relate to a housing, wherein one of the first protrusion and the second protrusion include a tapered edge.

In some aspects, the techniques described herein relate to a housing, wherein one of the attachment feature and the mating feature include an adhesive.

In some aspects, the techniques described herein relate to a housing, further including a plurality of cooling holes in one of the first wall and the third wall.

In some aspects, the techniques described herein relate to a mountable sensor housing system including: a front housing portion having: a front portion; a top portion; a bottom portion opposing the top portion; a first set of attachment features; and an opening located in the bottom portion; a rear housing portion having: a rear portion; a first side portion; a second side portion opposing the first side portion; a first plurality of cooling holes in one of the first side portion and the second side portion; a first slot in the rear portion, the first slot having a first recess and a first plurality of apertures; and a second set of attachment features configured to mate with the first set of attachment features; a first clip having a first body with a first set tapered appendages extending from ends of the first body, the first body being configured to fit within the first recess, one of the first set of tapered appendages being configured to fit within one of the first plurality of apertures; and a first sensor situated within the opening; wherein the first clip is configured to mount to a structure.

In some aspects, the techniques described herein relate to a system, wherein the first sensor is one of a temperature sensor and a humidity sensor.

In some aspects, the techniques described herein relate to a system, further including a second sensor situated within the opening.

In some aspects, the techniques described herein relate to a system, wherein the second sensor is the other of the temperature sensor and the humidity sensor.

In some aspects, the techniques described herein relate to a system, further including: a second slot in the rear portion, the second slot having a second recess and a second plurality of apertures; and a second clip having a second body with a second set of tapered appendages extending from ends of the second body, the second body being configured to fit within the second recess, one of the second set of tapered appendages being configured to fit within one of the second plurality of apertures.

In some aspects, the techniques described herein relate to a system, further including a series of serrations in the first clip body.

In some aspects, the techniques described herein relate to a system, further including a second plurality of cooling holes located in one of the first side portion and the second side portion opposing the first set of cooling holes.

In some aspects, the techniques described herein relate to a system, further including electronic receiving features arranged in the rear housing portion.

In some aspects, the techniques described herein relate to a system, wherein each of the first set of tapered appendages terminates in a raised ridge that is configured to sit outside the rear portion when the first set of tapered appendages are placed within the first plurality of slots in the rear housing.

In some aspects, the techniques described herein relate to a sensor housing system mountable to a railing including: a front housing portion having a first set of attachment features and an opening in a bottom portion; a rear housing portion having a second set of attachment features configured to mate with the first set of attachment features, and a plurality of slots in a rear portion; a plurality of clips configured to mount to the DIN rail, each of the plurality of clips being configured to fit within one of the plurality of slots, each of the plurality of clips having a body having a tapered appendage extending from each end of the body; and a sensor situated within the opening, the sensor being configured to detect conditions of an environment of the sensor; wherein the front housing portion and the rear housing portion are configured to secure together.

In some aspects, the techniques described herein relate to a system, further including a computing system housed within the front housing portion and the rear housing portion, the computing system configured to receive from the sensor environmental conditions detected.

In some aspects, the techniques described herein relate to a system, wherein the plurality of clips is removably secured to the rear housing portion in an assembled configuration.

In some aspects, the techniques described herein relate to a system, further including a plurality of cooling holes in the rear housing portion.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Sensors, such as temperature and humidity sensors, are known in the art. These sensors are generally placed in the vicinity of an object or area to monitor one or more characteristics thereof. For example, temperature sensors may be located near equipment to provide information regarding the temperature of the equipment and/or the ambient air around the equipment. Most equipment, such as electronic devices, is sensitive to temperature or changes in temperature, and have a range of temperatures within which the equipment may safely operate. Operating outside of this range may adversely affect the performance of the equipment, or even damage the equipment. Similar outcomes may stem from other environmental conditions of the equipment and the surrounding air, such as humidity. Thus, it is desirable to monitor these characteristics and conditions to avoid these adverse outcomes.

However, there is some difficulty in implementing sensors in and around certain equipment, such as with electronic equipment located in closed environments (e.g., inside cabinets). One issue is that temperature sensors typically use conductive nodes to measure heat. These conductive nodes provide a risk of shorting the electronic equipment. Another issue is that these sensors are difficult to install. Conventional sensors often require special tools and considerable effort to establish, especially when being located in constrictive spaces or spaces without suitable mounting systems in place.

It may be advantageous to have a sensor system that may monitor equipment or other devices while minimizing the impact the sensor system may have thereupon. It may further be advantageous to have a sensor system that is relatively easy/cost-effective to install. Embodiments of a mountable sensor housing system disclosed herein may provide for such a device.

Figure 7:
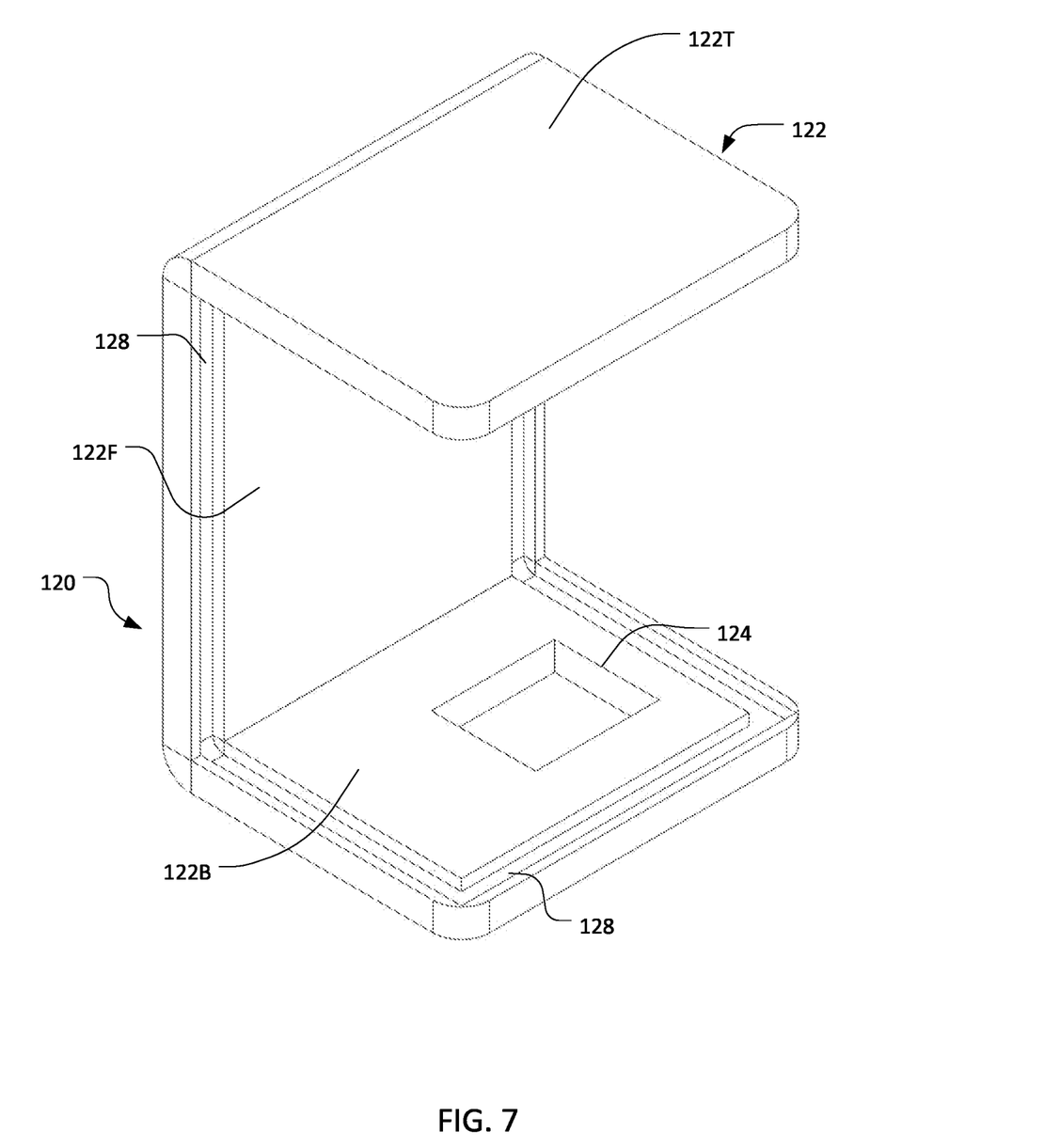
FIG. 7 is a perspective view of a front portion of the mountable sensor housing system of FIG. 1.
Figure 8:
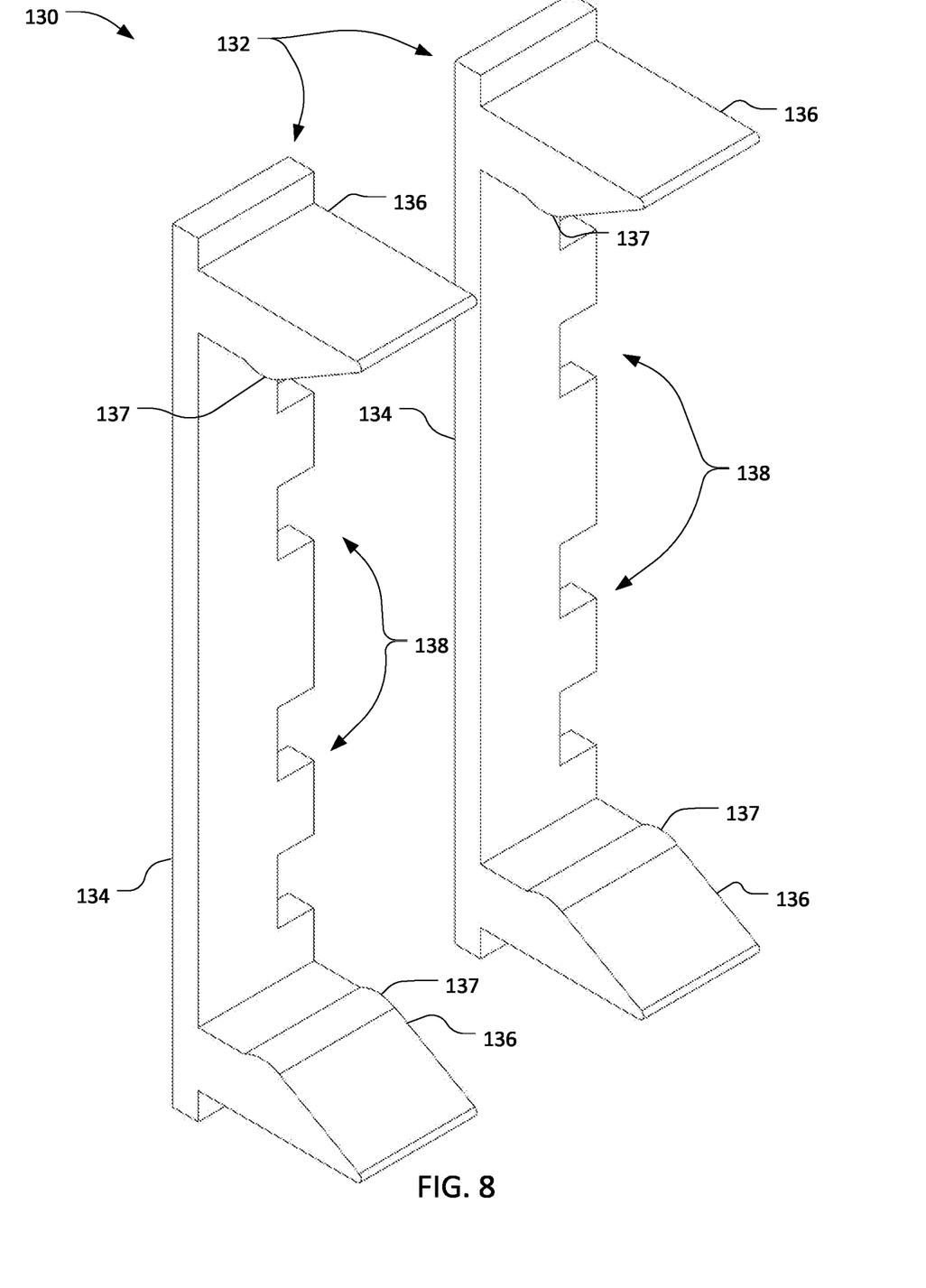
FIG. 8 is a perspective view of coupling features of the mountable sensor housing system of FIG. 1.
Figure 9:
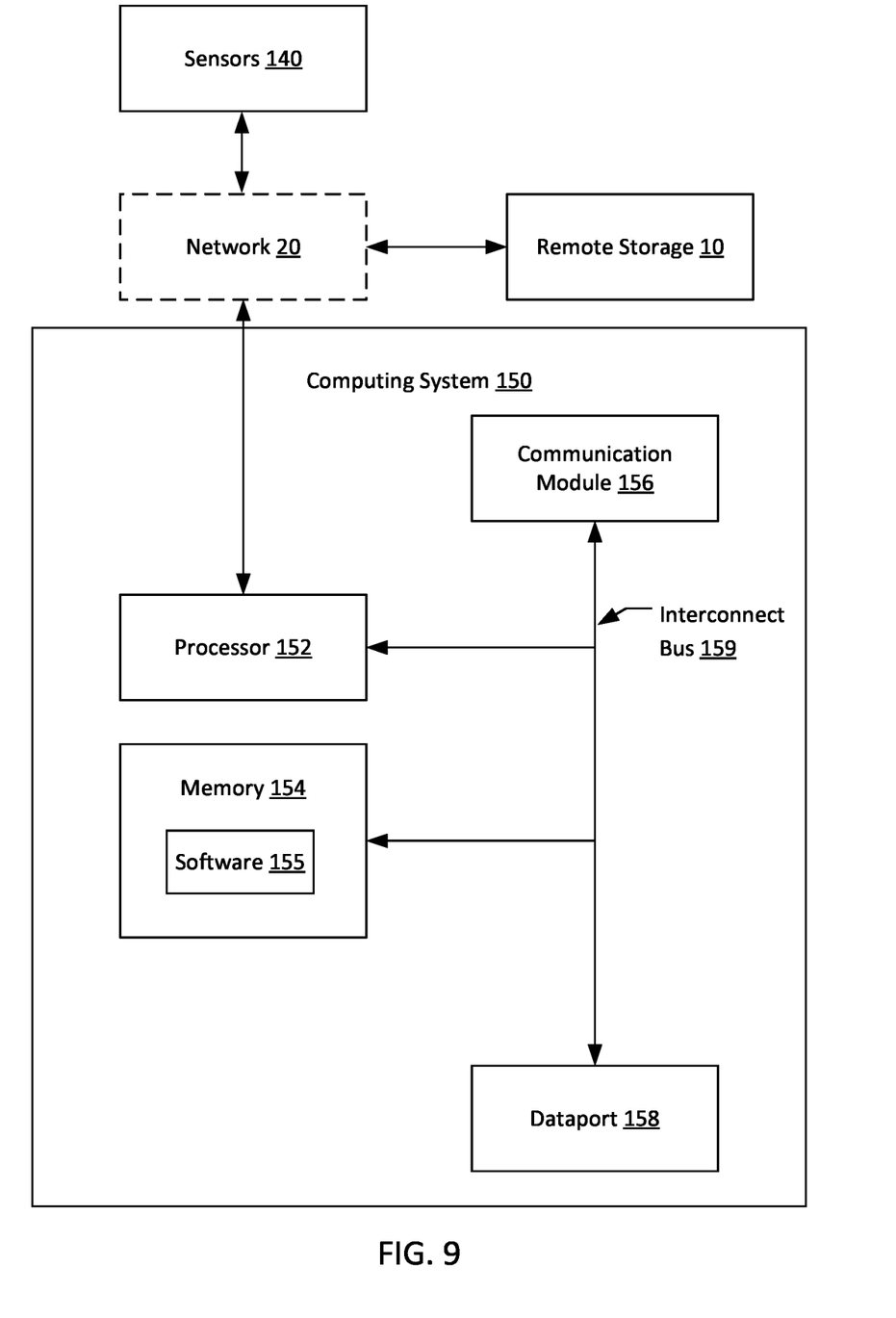
FIG. 9 is a block diagram depicting a computing system of the mountable sensor housing system of FIG. 1.

FIGS. 1-8 detail an embodiment 100 of a mountable sensor housing system for monitoring a device or a piece of equipment. The mountable sensor housing system 100 may have one or more features, such as a sensor, which provide or detect information regarding a characteristic of the monitored device and/or the environment of the monitored device. The mountable sensor housing system 100 may, in embodiments, alternatively or additionally generate alerts or provide other functions in response to the sensor detections. The mountable sensor housing system 100 may be removably couplable to infrastructure, such as a Deutches Institut fur Normung (DIN) rail which is commonly used in and around electronic equipment. In embodiments, the mountable sensor housing system 100 may include a computing system 150 (FIG. 9).

Figure 1:
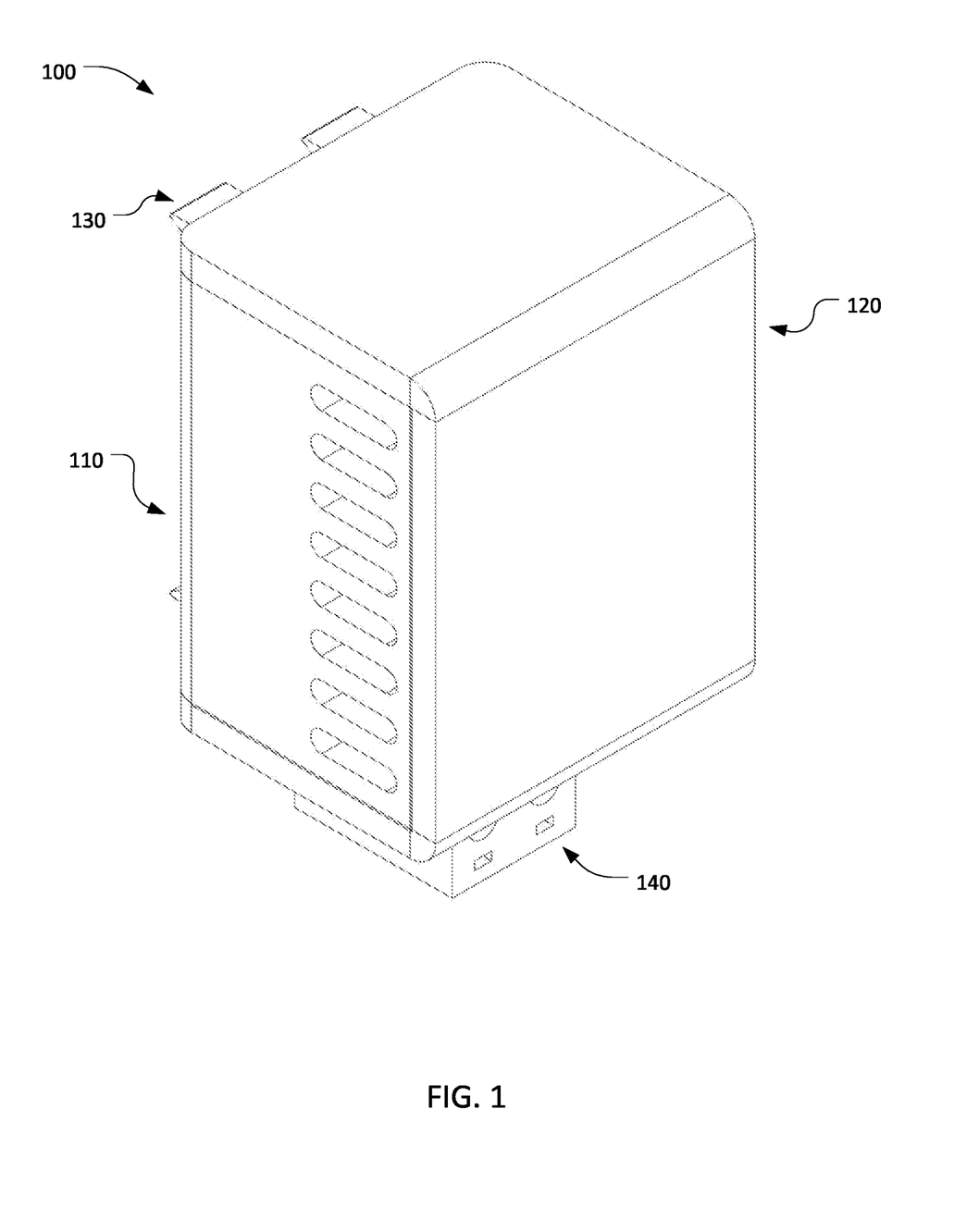
FIG. 1 is a perspective view of a mountable sensor housing system, according to an embodiment of the disclosure.
Figure 2:
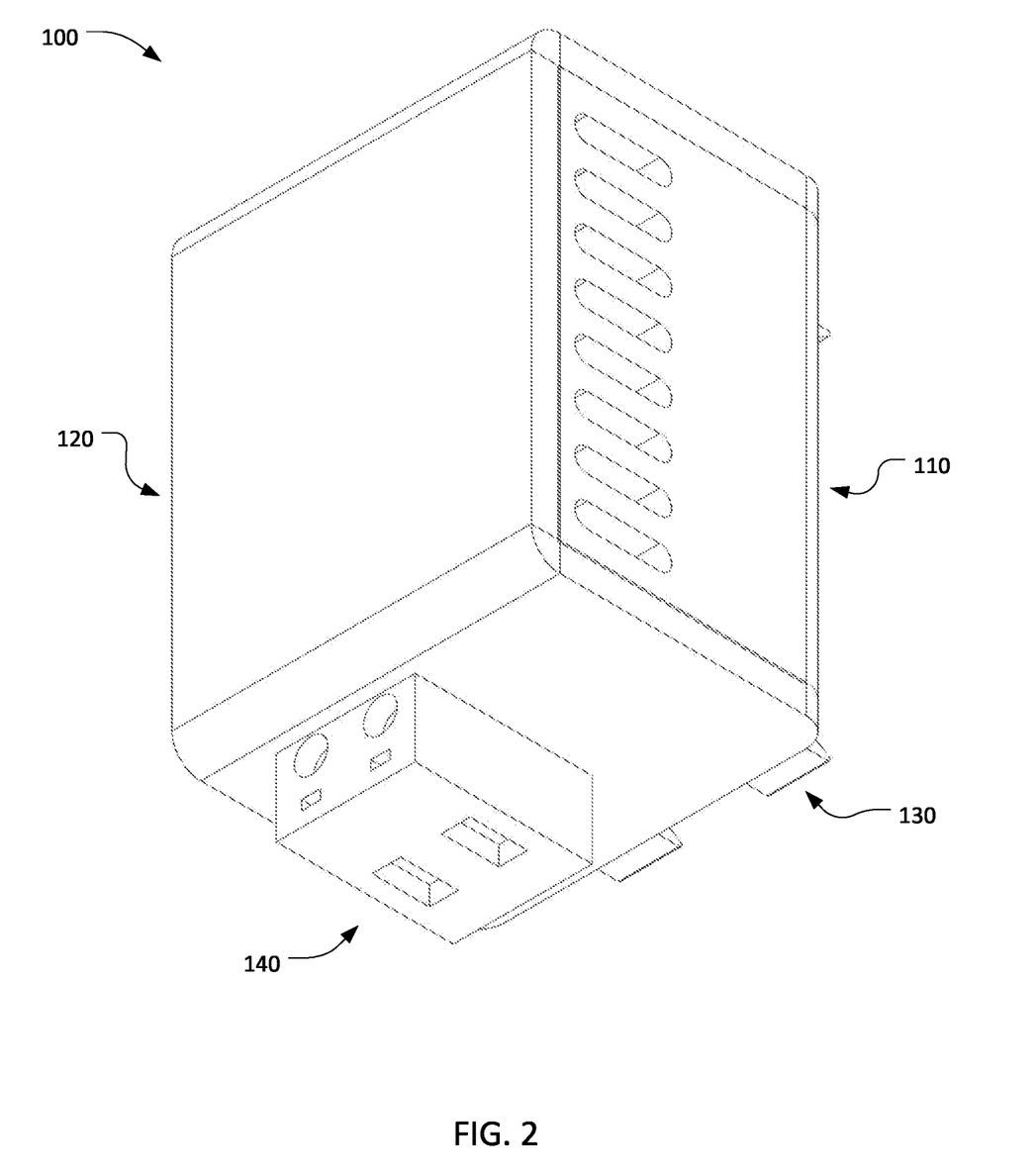
FIG. 2 is another perspective view of the mountable sensor housing system of FIG. 1.
Figure 3:
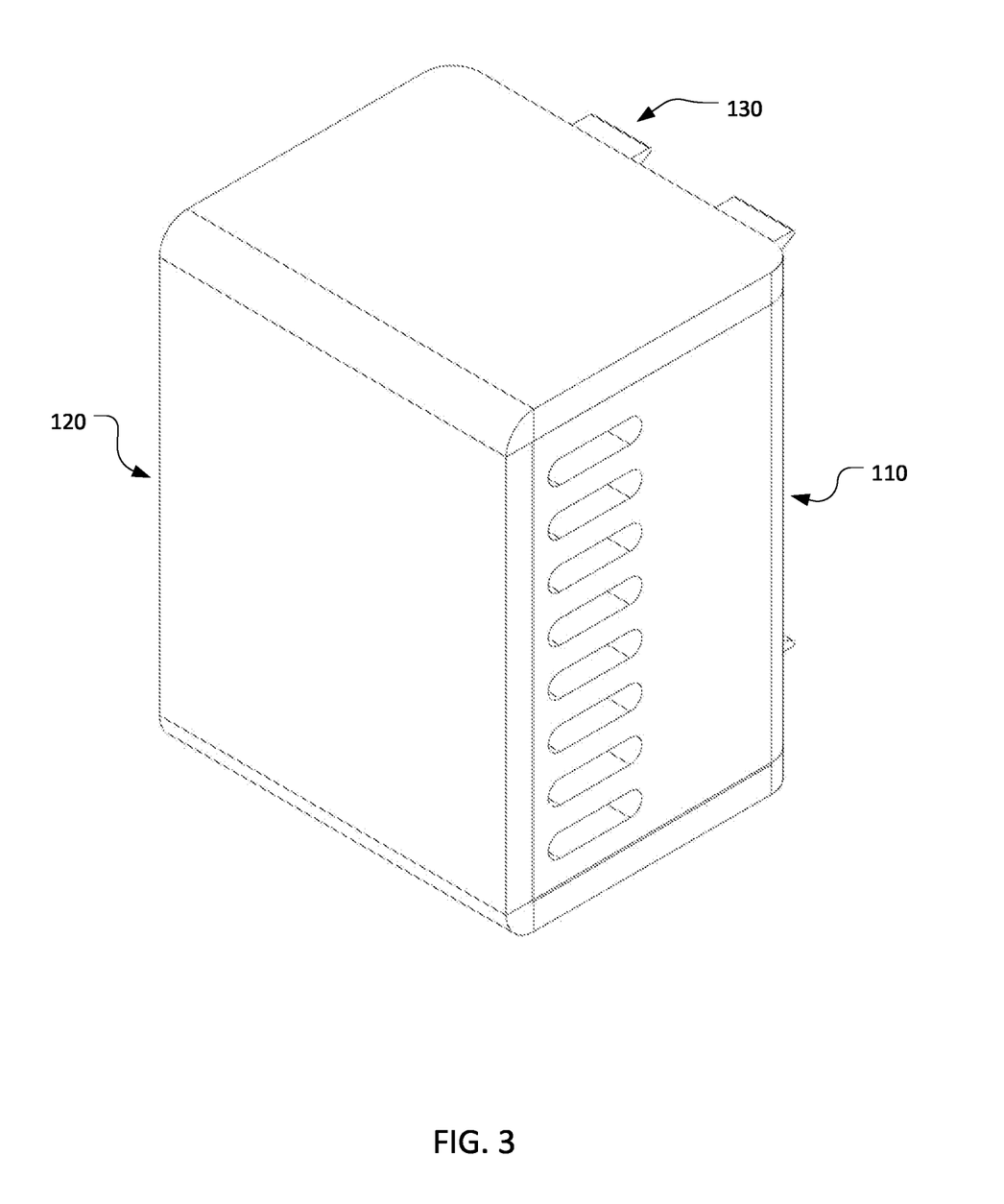
FIG. 3 is still another perspective view of the mountable sensor housing system of FIG. 1.
Figure 4:
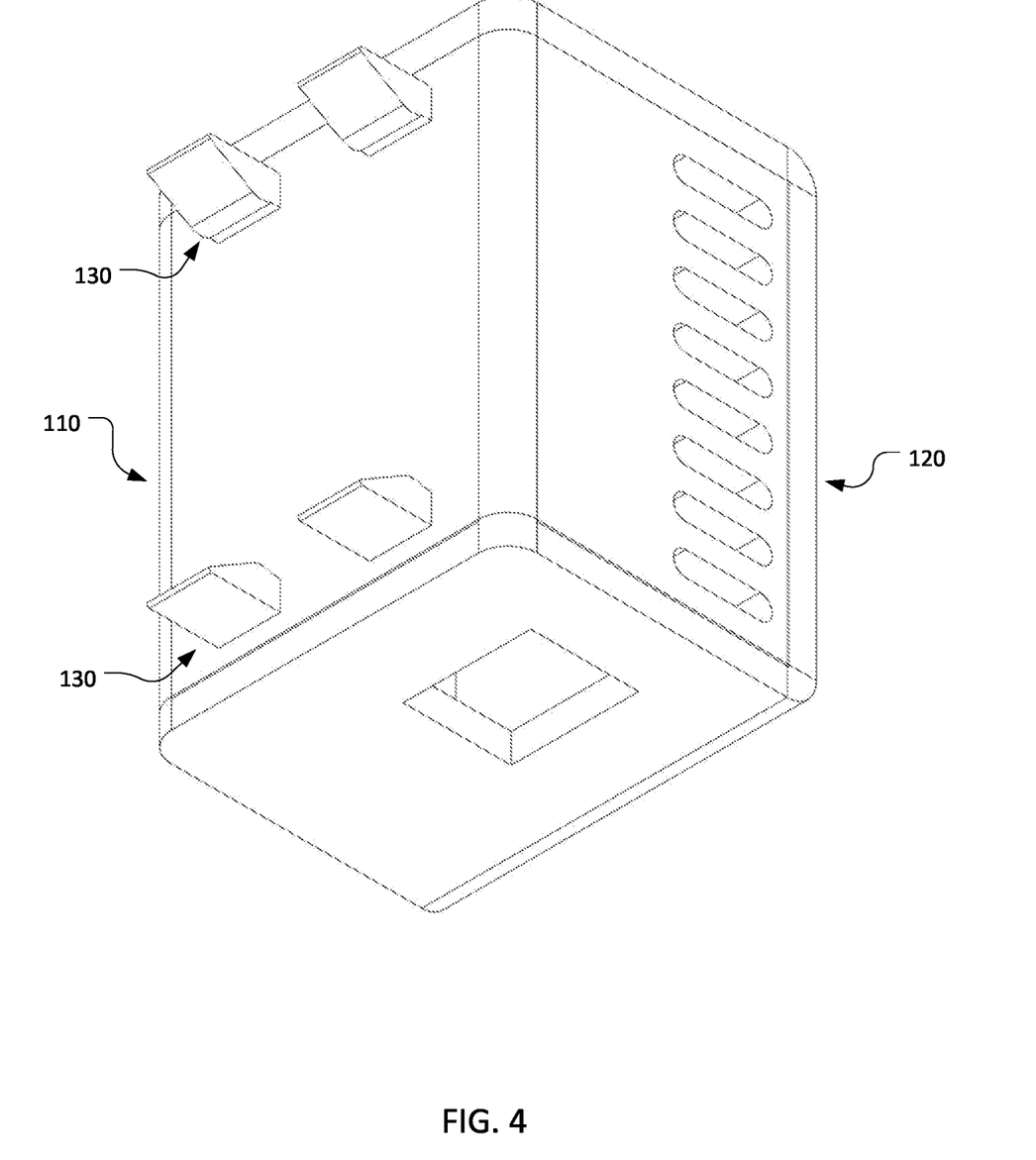
FIG. 4 is yet another perspective view of the mountable sensor housing system of FIG. 1.

FIGS. 1 and 2 show the mountable sensor housing system 100 comprising a rear housing portion 110 and a front housing portion 120 which contain coupling features 130 (also shown in FIGS. 4 and 8) and a sensor 140. FIGS. 3 and 4 show the system 100 without the sensor 140. The housings 110 and 120 may be disparate pieces that come together to support the sensor 140 and any other electronics associated therewith. Coupling features 130 may be, for example, clips that may removably couple the system 100 to mounting infrastructure such as DIN railings.

Figure 5:
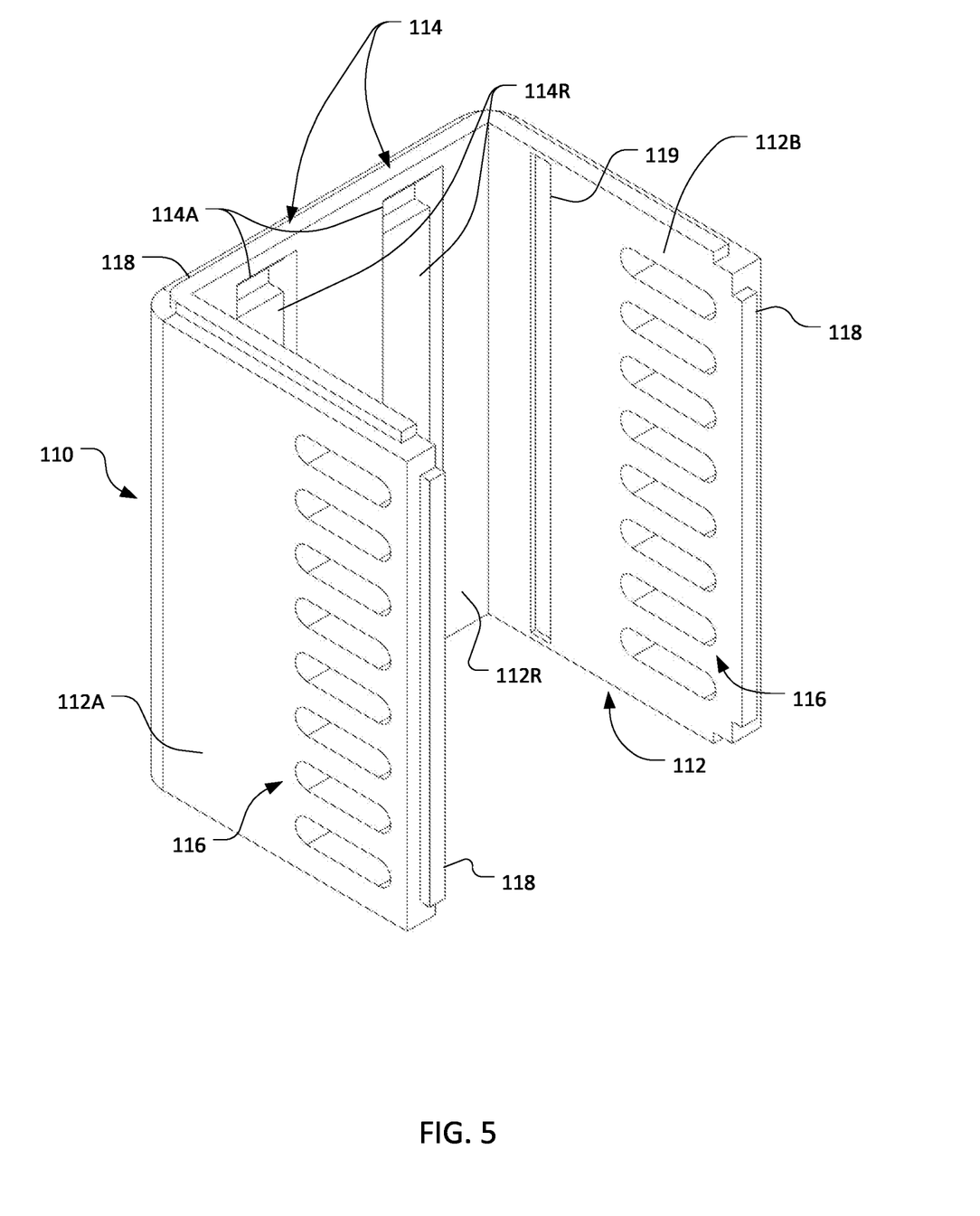
FIG. 5 is a perspective view of a rear portion of the mountable sensor housing system of FIG. 1.

The rear housing portion 110 is shown in greater detail in FIG. 5, devoid of the front housing 120, the coupling features 130, and the sensor 140. The rear housing 110 may comprise a U-shaped case 112 having one or more slots 114, a plurality of ports 116, attachment features 118, and electronic receiving features 119. The case 112 may comprise a rear portion 112R from which a first side portion 112A and a second side portion 112B opposing the first side portion 112A extends. The slots 114 may retain therein one or more of the coupling features 130 (FIG. 8). The slots 114 may comprise a combination of recesses in the case 112 and/or apertures through the case 112 to accomplish this purpose. For instance, recesses 114R of the slots 114 may retain portions of the coupling features 130, and apertures 114A of the slots 114 may fit other portions of the coupling features 130 (e.g., by allowing a portion of the coupling features 130 to pass or extend through the case 112). In embodiments, each of the slots 114 may comprise two or more apertures 114A per recess 144R. The slots 114, in embodiments, may make use of securing methods for ensuring the coupling features 130 remain in place, such as adhesives (e.g., glue) or snap-fit methods.

The ports 116 may be openings in the case 112 configured to promote airflow therethrough. The ports 116 may preclude the build up of dust or other debris that may undesirably harm the efficacy of the sensor housing system 100. While the figures depict two sets of ports 116 on opposing sides of the case 112, the artisan would understand that the ports 116 may instead comprise any other suitable number or arrangement of openings as desired.

The attachment features 118 may be components of the case 112 that are configured to mate with corresponding portions of the front portion 120, and thereby secure together the portions 110 and 120. For example, the attachment features 118 may take the form of a series of recesses and protrusions along one or more edges of the case 112 that correspond to attachment features 128 (FIG. 7) of the front portion 120. In operation, the attachment features 118 and 128 may cooperate to mechanically join the portions 110 and 120 together in a relatively easy manner. Components of the mountable sensor housing system 100 (e.g., the sensor 140) may be placed within the portions 110 and 120, and the portions 110 and 120 may be "snapped" together (i.e., the attachment features 118 and 128 may selectively, temporarily secure together without the use of adhesives). Such a configuration may improve manufacturing effort and costs, while providing a platform which is readily accessible for repairs or replacement later in part life. Like with the slots 114 and the coupling features 130, the attachment features 118 may make use of other securing methods such as adhesives to secure the portions 110 and 120 together.

The electronics reception area 119 may be one or more slots, apertures, protrusions, and/or other features that may be configured to retain electronics 145 (FIG. 6) of the system 100. The electronics reception area 119 may be, for example, slots in opposing sides of the case 112 for holding a circuit board (e.g., a circuit board of the sensor 140) and/or other portions of the computing system 150 (FIG. 9).

Figure 6:
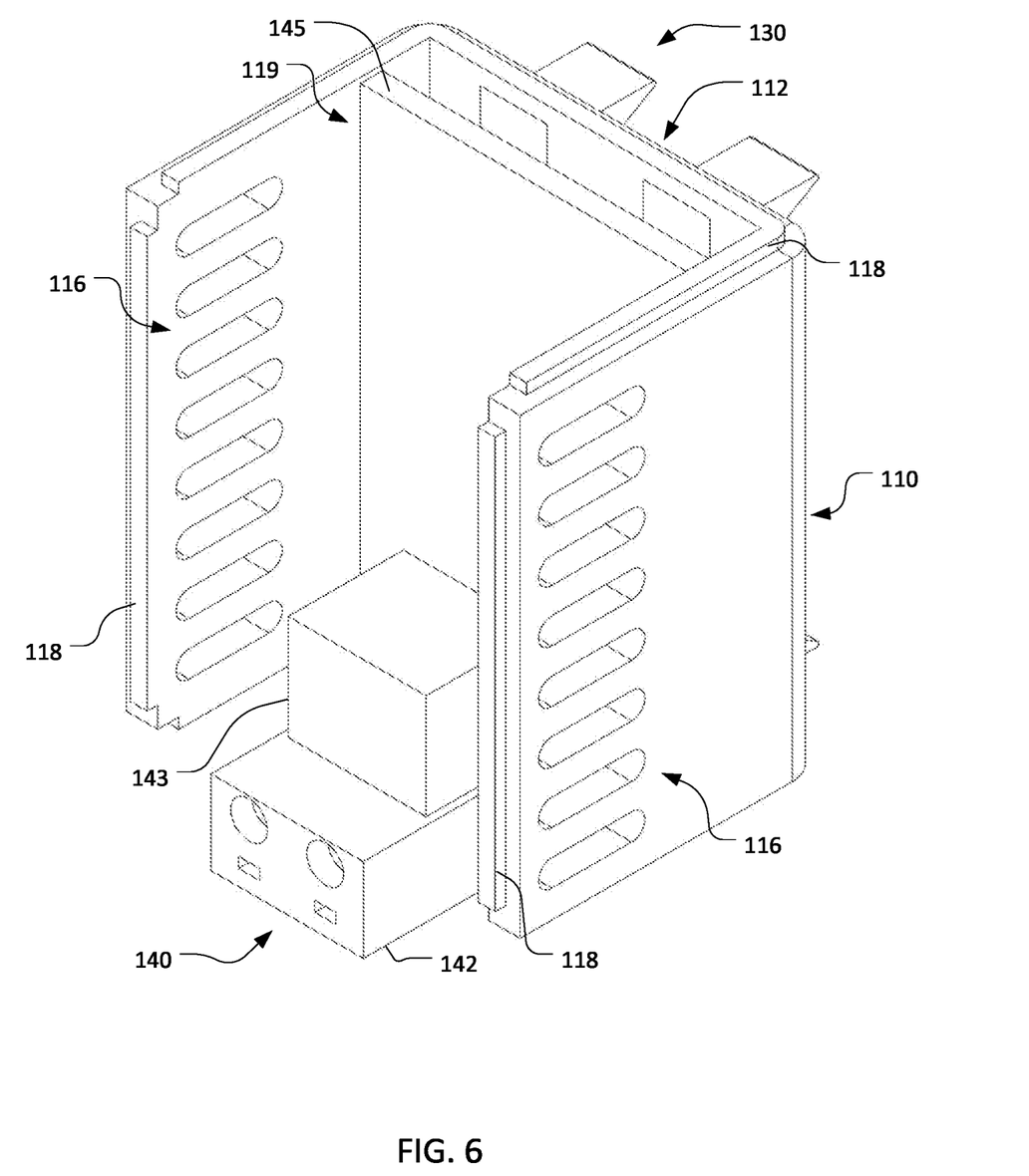
FIG. 6 is perspective view of a sensor and the rear portion of the mountable sensor housing system of FIG. 1.

FIG. 6, like FIG. 5, shows the rear portion 110 in more detail. However, FIG. 6 includes the coupling features or clips 130 and the sensor 140. The electronics 145 of the sensor 140 may be held by the electronics reception area 119, and may be joined to a sensing node 142 of the sensor 140 via a sensor coupling 143. Though the sensor coupling 143 is depicted here as a physical coupling between the sensor node 142 and the electronics 145, the artisan would understand that, in embodiments, the sensor coupling 143 may alternatively or additionally comprise wireless aspects such that the sensor node 142 and the electronics 145 may be communicatively coupled sans a physical connection.

Turning now to FIG. 7, the front housing portion 120 is shown in more detail. Similar to the rear portion 110, the front portion 120 may comprise a U-shaped case 122 having attachment features 128. The case 122 may further comprise a front portion 122F, and a top portion 122T and a bottom portion 122B opposing the top portion 122T extending from the front portion 122F. The attachment features 128 may be, for example, a series of protrusions, recesses, and/or apertures along one or more edges of the case 122 that correspond to the attachment features 118 (e.g., in a male/female configuration) to assist in securing the portions 110 and 120 together. The front portion 120 may have indicia thereupon which may indicate to a user information such as the correct arrangement of polarity for the sensor 140, and other such similar information.

The front portion 120 may further comprise an aperture 124 for receiving the sensor 140 (e.g., in the case bottom portion 122B). By providing a void in the case 122 via the aperture 124, portions of the sensor 140 may extend beyond one or more extents of the portions 110 and 120. This may make the sensor 140 (e.g., the sensing node 142 and/or the sensor coupling 143) readily available for interaction with by a user. Furthermore, such an arrangement may facilitate the detection of characteristics in the surrounding environment, such as the temperature of the ambient air with a temperature sensor.

The coupling features 130, as best seen in FIG. 8, may comprise one or more clips 132, each of which may include a body 134, one or more tapered appendages or protrusions 136, and serrations 138. The clips 132 may settle within the portions 110 and 120, while the appendages 136 extend therefrom. In this way, the appendages 136 may be capable of grasping an object, such as a railing (e.g., a DIN railing), and retaining the system 100 thereto (e.g., via tension forces). Arranged in this manner, the rear portion 110 may be adjacent the DIN rail the system is attached to, and in between the DIN rail and the front portion 120.

The body 134 of each clip 132 may be formed to fit within the slots 114 of the rear portion 110, and as such may have extensions or other features configured to retain the clip 132 therein. For example, the serrations 138 may mate with the rear portion 110 to accomplish this. Each of the clips 132 may have a one or more tapered appendages 136 configured to extend beyond the rear portion 110, and contact the DIN rail. Once in contact, the system 100 may be secured to the DIN rail by nature of the mechanical spring tension of the clips 132. The appendages 136 may extend (e.g., extend perpendicularly) from each end of the body 132. Each of the appendages 136 may have a raised protuberance or ridge 137 which may be located at an end of a taper (i.e., adjacent the body 132). Such ridges 137 may facilitate the installment and retention of the system 100 to the DIN rail while remaining relatively easy for a user to remove.

The system 100 may be installed on the DIN rail by pressing the appendages 136 against the extents of the DIN rail. The tapered nature of the appendages 136 may force the clips 132 to displace around the DIN rail, until the ridges 137 are reached. There, the ridges may pass over the edge of the DIN rail and "snap" down, thus securing the system 100 thereto. Removal of the system 100 may be carried out by effectively reversing this process, tilting and sliding the appendages 136 off the DIN rail.

The sensor 140 may be any suitable sensor now known or subsequently developed for the detecting of one or more characteristics of equipment and/or the environment of the equipment. For example, the sensor 140 may be a temperature sensor or a humidity sensor. The detections made by the sensor 140 may be routed to the electronics 145 and/or the computing system 150, whereupon a response may be made to the detection, such as through the generation of an alert.

In an embodiment, the sensor 140 may be a temperature sensor that uses a voltage signal to detect a temperature. The sensor 140 may operate in the 4-20 milliAmp range to make temperature readings of equipment, such as very low frequency drive equipment. Such equipment may be sensitive to temperature (e.g., in the 160-170 degrees Fahrenheit range) and changes thereof. The sensor 140 may make use of a pluggable terminal block to make electronic connections, such as with the electronics 145.

The mountable sensor housing system 100 components may be made of any suitable material now known or subsequently developed, such as a temperature resistant plastic. A temperature resistant plastic may be desirable in use with a temperature sensor 140 to ensure the continued operation of the system 100 in hotter environments.

Several advantages may stem from the above-described mountable sensor housing system embodiments. The mountable sensor housing system embodiments may facilitate the detection of environmental characteristics, while being easily installable on parts such as DIN rails. For example, the coupling features 130 may enable the system 100 to be removably coupled to the DIN rail by a user without the use of tools. The mountable sensor housing system 100 may be relatively easier to maintain, replace, and/or repair than conventional systems given the ease with which it is to assemble and install the system 100. Furthermore, the mountable sensor housing system 100 may be integrated with control systems for expanded functionality in response to sensor 140 detections.

Figure 10:
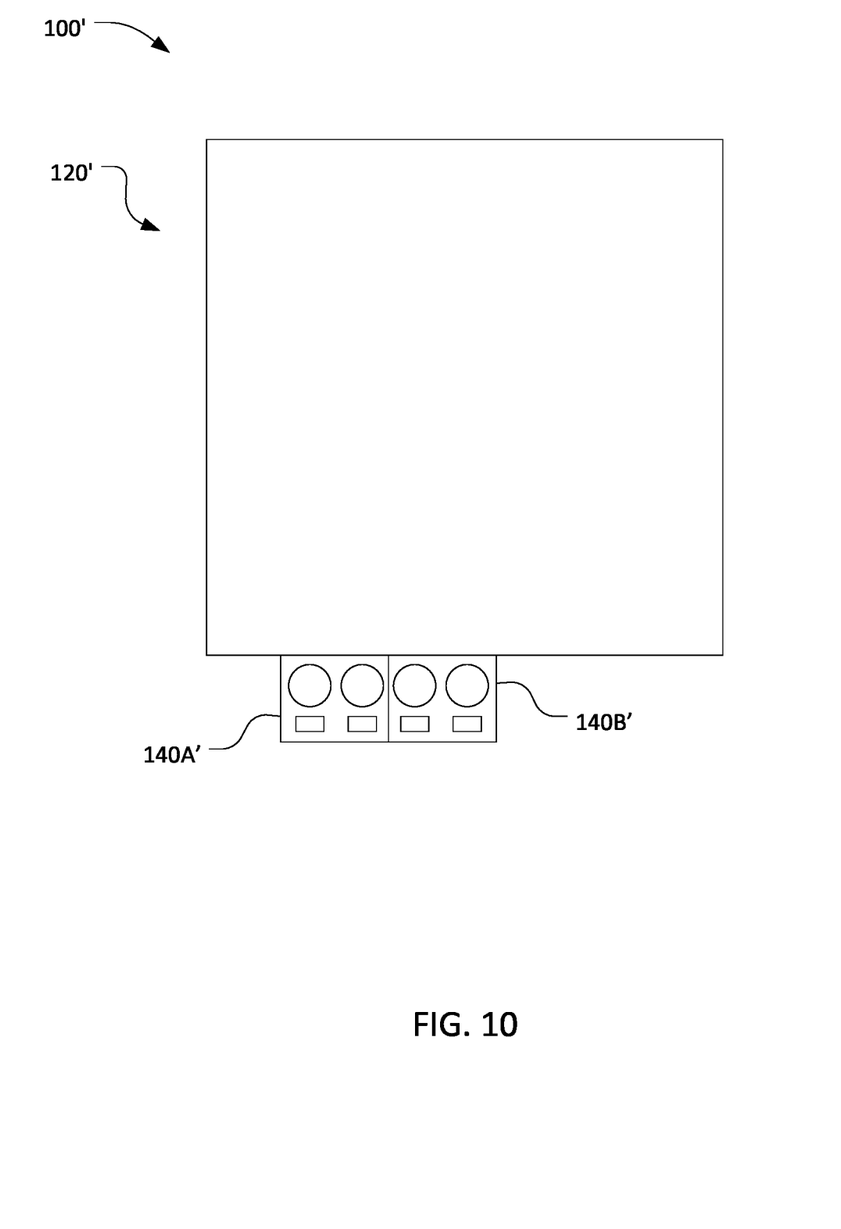
FIG. 10 is a front view of a mountable sensor housing system, according to another embodiment of the disclosure.

FIG. 10 depicts an embodiment 100' of the mountable sensor housing system which is substantially the same as the system 100, except where explicitly noted or would be inherently implied. One difference between the embodiment 100' and the embodiment 100 is that the embodiment 100' may have one or more portions sized to fit a larger sensor and/or multiple sensors. For example, the mountable sensor housing system 100' may have an enlarged front portion 120' which can accommodate both a first sensor 140A' (e.g., a temperature sensor) and a second sensor 140B' (e.g., a humidity sensor). The enlarged sensor housing system 100' may, in this manner, advantageously monitor several different environmental conditions (e.g., temperature, humidity etc.) at the same time.

FIG. 9 depicts a functional block diagram of an example computing system 150 which may be used to implement the various mountable sensor housing system embodiments according to the different aspects of the present disclosure. The sensor housing system may make use of a plurality of these and/or other, computing systems. The computing system 150 may be, for example, a smartphone, a laptop computer, a desktop computer, a flexible circuit board, or other computing device whether now known or subsequently developed. As mentioned above, the computing system may, in embodiments, form at least part of the sensor 140 and/or the electronics 145 housed within the portions 110 and 120. The computing system 150 comprises a processor 152, the memory 154, a communication module 156, and a data port 158. These components may be communicatively coupled together by an interconnect bus 159. The processor 152 may include any processor used in smartphones and/or other computing devices, including an analog processor (e.g., a Nano carbon-based processor). In certain embodiments, the processor 152 may include one or more other processors, such as one or more microprocessors, and/or one or more supplementary co-processors, such as math co-processors.

The memory 154 may include both operating memory, such as random access memory (RAM), as well as data storage, such as read-only memory (ROM), hard drives, optical, flash memory, disk drives, solid state drives, or any other suitable memory/storage element. The memory 154 may include removable memory elements, such as a CompactFlash card, a MultiMediaCard (MMC), and/or a Secure Digital (SD) card. In certain embodiments, the memory 154 includes a combination of magnetic, optical, and/or semiconductor memory, and may include, for example, RAM, ROM, flash drive, a hard disk, and/or a solid-state drive. The processor 152 and the memory 154 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 152 may be connected to the memory 154 via the data port 158.

The communication module 156 may be configured to handle communication links between the computing system 150 and other external devices or receivers, and to route incoming/outgoing data appropriately. For example, inbound data from the data port 158 may be routed through the communication module 156 before being directed to the processor 152, and outbound data from the processor 152 may be routed through the communication module 156 before being directed to the data port 158. The communication module 156 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The data port 158 may be any type of connector used for physically interfacing with a smartphone, computer, and/or other devices, such as a USB port, a mini-USB port, or an IPHONE®/IPOD® 30-pin connector or LIGHTNING® connector. In other embodiments, the data port 158 may include multiple communication channels for simultaneous communication with, for example, other processors, servers, and/or client terminals.

The memory 154 may store instructions for communicating with other systems, such as a computer. The memory 154 may store, for example, a program (e.g., computer program code) adapted to direct the processor 152 in accordance with the embodiments described herein. The instructions also may include program elements, such as an operating system. While execution of sequences of instructions in the program causes the processor 152 to perform the process steps or functions described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 154 includes software 155. The software 155 may contain machine-readable instructions configured to be executed by the processor 152. The software 155 may, for example, be configured to perform the functions of the sensor housing system embodiments described herein. In embodiments, the software 155 may cause the computing system 150 to dynamically respond to a user input. For example, the software 155 may adjust parameters and/or tolerances of the sensor 140, or generate alerts in response to sensor 140 detections.

The computing system 150 may be in data communication with a remote storage 10 over a network 20. The network 20 may be a wired network, a wireless network, or comprise elements of both. In embodiments, the network 20 may communicatively link one or more components of the sensor housing system. For example, the sensor 140 may be communicatively linked to the computing system 150 via the network 20 for the exchange of information therebetween. The remote storage 10 may be, for example, the "cloud" or other remote storage in communication with other computing systems. In embodiments, data (e.g., sensor 140 information, system responses to sensor 140 information, etc.) may be stored in the remote storage 10 for analytics or other purposes.

The artisan will understand that the mountable sensor housing system embodiments disclosed herein may include or have associated therewith additional electronics (e.g., the computing system, data servers, et cetera). The electronics may be used to control and modify the operation of the mountable sensor housing system (e.g., to detect and transmit sensor readings, to generate sensor alerts, to modify operation of a device in response to a sensor reading, et cetera). In some example embodiments, the processor or processors may be configured through particularly configured hardware, such as an application specific integrated circuit (ASIC), field-programmable gate array (FPGA), etc., and/or through execution of software to allow the mountable sensor housing system to function in accordance with the disclosure herein. Likewise, the mountable sensor housing system may make use of a user interface (e.g., a tactile interface, graphical user interface, etc.) implemented on one or more computing systems and/or the sensor housing (e.g., housing 110 and/or 120) itself, to carry out embodiments of the functions and features described herein. Furthermore, the system 100 may comprise a power source, such as a portable power source.

The above description clearly establishes the advantages provided by the present disclosure which need not be explained in greater detail to those skilled in the art, who will also recognize that various design modifications and differing components can be introduced within the scope of the present disclosure as set forth herein. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and sub-combinations are of utility and may be employed without reference to other features and sub-combinations and are contemplated within the scope of the disclosure.

The disclosure claimed is:

1. A housing for housing a sensor, the housing comprising:
    a first U-shaped portion, the first U-shaped portion having a first wall, a second wall, and a third wall, the first wall opposing the third wall, each of the first wall and the third wall extending perpendicularly from the second wall, the second wall having at least one slot, the at least one slot having a recess with a first aperture and a second aperture each extending through the second wall, the first wall and the third wall each having a respective reception area, and at least one of the first wall, the second wall, and the third wall having an attachment feature;
    a second U-shaped portion, the second U-shaped portion having a fourth wall, a fifth wall, and a sixth wall, the fourth wall and the sixth wall extending perpendicularly from the fifth wall, at least one of the fourth wall and the sixth wall having a hole extending therethrough, and a mating feature being provided on at least one of the fourth wall, the fifth wall, and the sixth wall;
    a clip having a first protrusion and a second protrusion, the clip being situated within the slot such that a portion of the clip is within said recess, the first protrusion extends through the first aperture, and the second protrusion extends through the second aperture; and
    a circuit board associated with the sensor, the circuit board being received within the respective reception areas such that the sensor extends through the hole;

wherein:
    the first U-shaped portion and the second U-shaped portion are coupled to each other such that the attachment feature mates with the mating feature; and
    the first protrusion and the second protrusion are configured to mount said housing to a railing.

2. The housing of claim 1, wherein the railing is a DIN railing.

3. The housing of claim 1, further comprising a computing system configured to receive sensor detections from the sensor.

4. The housing of claim 1, wherein the attachment feature and the mating feature are configured to temporarily secure the first U-shaped portion and the second U-shaped portion together.

5. The housing of claim 1, wherein one of the first protrusion and the second protrusion include a tapered edge.

6. The housing of claim 1, wherein one of the attachment feature and the mating feature include an adhesive.

7. The housing of claim 1, further comprising a plurality of cooling holes in one of the first wall and the third wall.

8. A mountable sensor housing system comprising:
    a front housing portion having:
        a front portion;
        a top portion;
        a bottom portion opposing the top portion;
        a first set of attachment features; and
        an opening located in the bottom portion;
    a rear housing portion having:
        a rear portion;
        a first side portion;
        a second side portion opposing the first side portion;
        a first plurality of cooling holes in one of the first side portion and the second side portion;
        a first slot in the rear portion, the first slot having a first recess and a first plurality of apertures; and
        a second set of attachment features configured to mate with the first set of attachment features;
    a first clip having a first body with a first set tapered appendages extending from ends of the first body, the first body being configured to fit within the first recess, one of the first set of tapered appendages being configured to fit within one of the first plurality of apertures; and
    a first sensor situated within the opening;
    wherein the first clip is configured to mount to a structure.

9. The system of claim 8, wherein the first sensor is one of a temperature sensor and a humidity sensor.

10. The system of claim 9, further comprising a second sensor situated within the opening.

11. The system of claim 10, wherein the second sensor is the other of the temperature sensor and the humidity sensor.

12. The system of claim 8, further comprising:
    a second slot in the rear portion, the second slot having a second recess and a second plurality of apertures; and
    a second clip having a second body with a second set of tapered appendages extending from ends of the second body, the second body being configured to fit within the second recess, one of the second set of tapered appendages being configured to fit within one of the second plurality of apertures.

13. The system of claim 8, further comprising a series of serrations in the first clip body.

14. The system of claim 8, further comprising a second plurality of cooling holes located in one of the first side portion and the second side portion opposing the first set of cooling holes.

15. The system of claim 8, further comprising electronic receiving features arranged in the rear housing portion.

16. The system of claim 8, wherein each of the first set of tapered appendages terminates in a raised ridge that is configured to sit outside the rear portion when the first set of tapered appendages are placed within the first plurality of slots in the rear housing.

17. A sensor housing system mountable to a railing comprising:
   a front housing portion having a first set of attachment features and an opening in a bottom portion;
   a rear housing portion having a second set of attachment features configured to mate with the first set of attachment features, and a plurality of slots in a rear portion;
   a plurality of clips configured to mount to the DIN rail, each of the plurality of clips being configured to fit within one of the plurality of slots, each of the plurality of clips having a body having a tapered appendage extending from each end of the body; and
   a sensor situated within the opening, the sensor being configured to detect conditions of an environment of the sensor;
   wherein the front housing portion and the rear housing portion are configured to secure together.

18. The system of claim 17, further comprising a computing system housed within the front housing portion and the rear housing portion, the computing system configured to receive from the sensor environmental conditions detected.

19. The system of claim 17, wherein the plurality of clips is removably secured to the rear housing portion in an assembled configuration.

20. The system of claim 17, further comprising a plurality of cooling holes in the rear housing portion.

* * * * *